United States Patent
He

(10) Patent No.: US 7,512,043 B2
(45) Date of Patent: Mar. 31, 2009

(54) APPARATUS AND METHOD FOR GENERATING A TRACKING ERROR SIGNAL IN AN OPTICAL DISC DRIVE

(75) Inventor: Wei-Hung He, Taipei Hsien (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 526 days.

(21) Appl. No.: 11/160,820

(22) Filed: Jul. 12, 2005

(65) Prior Publication Data
US 2006/0007807 A1    Jan. 12, 2006

Related U.S. Application Data

(63) Continuation-in-part of application No. 11/160,692, filed on Jul. 6, 2005.

(30) Foreign Application Priority Data

Jul. 8, 2004   (TW) .............................. 93120463 A
Jul. 22, 2004  (TW) .............................. 93121904 A

(51) Int. Cl.
*G11B 7/00* (2006.01)
(52) U.S. Cl. ................... 369/44.34; 369/44.35
(58) Field of Classification Search ............... None
See application file for complete search history.

(56) References Cited

U.S. PATENT DOCUMENTS 4,785,441 A   11/1988 Tanaka et al.
5,060,216 A   10/1991 Suzuki et al.
5,117,408 A   5/1992  Weispfenning
5,666,341 A   9/1997  Horibe
5,956,304 A   9/1999  Supino et al.
6,137,755 A   10/2000 Bakx et al.
6,236,628 B1* 5/2001  Kim .......................... 369/44.41
6,504,799 B1* 1/2003  Yamashita et al. ......... 369/44.11
6,741,532 B1* 5/2004  Graba et al. ............. 369/44.28
6,741,533 B1  5/2004  Hiratsuka
6,781,932 B2* 8/2004  Beatson .................... 369/44.41
6,937,542 B1* 8/2005  Ogawa ..................... 369/44.13
6,954,709 B2  10/2005 Mashimo
7,161,877 B2* 1/2007  Lai et al. .................. 369/30.21
7,295,498 B2  11/2007 Nakano
2003/0046037 A1  3/2003 Mashimo
2003/0107961 A1  6/2003 Yasuda
2003/0202438 A1* 10/2003 Nomoto .................... 369/44.41

(Continued)

FOREIGN PATENT DOCUMENTS

CN           1321304 A       11/2001

(Continued)

*Primary Examiner*—Wayne R Young
*Assistant Examiner*—Lixi Chow
(74) *Attorney, Agent, or Firm*—Winston Hsu

(57) ABSTRACT

The present invention discloses an apparatus and method for generating a tracking error signal in an optical disc drive. The method includes: receiving a first and a second analog signals; converting the first and the second analog signals into a first and a second digital signals respectively; delaying the first and second digital signals to generate a first and a second delay signals respectively; generating the tracking error signal according to the first and second digital signals and the first and second delay signals.

19 Claims, 3 Drawing Sheets

U.S. PATENT DOCUMENTS

2004/0081040 A1    4/2004   Yamamoto
2004/0151089 A1*   8/2004   Buchler et al. ............ 369/44.34
2004/0160250 A1*   8/2004   Kim et al. .................... 327/158
2004/0196755 A1*  10/2004   Cheng ...................... 369/44.25

FOREIGN PATENT DOCUMENTS

| | | |
|---|---|---|
| CN | 1133991 C | 1/2004 |
| TW | 513716 | 12/2002 |

* cited by examiner

| S1 | S2 | D1 | D2 | UP | Down |
|----|----|----|----|----|------|
| 1  | 0  | 0  | 0  | 1  | 0    |
| 0  | 1  | 1  | 1  | 1  | 0    |
| 0  | 1  | 0  | 0  | 0  | 1    |
| 1  | 0  | 1  | 1  | 0  | 1    |
| 0  | 0  | 1  | 0  | 0  | 1    |
| 1  | 1  | 0  | 1  | 0  | 1    |
| 0  | 0  | 0  | 1  | 1  | 0    |
| 1  | 1  | 1  | 0  | 1  | 0    |
| 0  | 0  | 0  | 0  | 0  | 0    |
| 1  | 1  | 0  | 0  | 0  | 0    |
| 1  | 0  | 1  | 0  | 0  | 0    |
| 1  | 0  | 0  | 1  | 0  | 0    |
| 0  | 1  | 1  | 0  | 0  | 0    |
| 0  | 1  | 0  | 1  | 0  | 0    |
| 0  | 0  | 1  | 1  | 0  | 0    |
| 0  | 0  | 0  | 0  | 0  | 0    |

Fig. 2

APPARATUS AND METHOD FOR GENERATING A TRACKING ERROR SIGNAL IN AN OPTICAL DISC DRIVE

CROSS REFERENCE TO RELATED APPLICATIONS

This is a continuation-in-part of U.S. Application No. 11/160,692, which was filed on Jul. 6, 2005 and is included herein by reference.

BACKGROUND OF THE INVENTION

1. Field of the Invention

The present invention relates to an optical disc drive, and more particularly, to an apparatus and related method for generating a tracking error signal in the optical disc drive.

2. Description of the Prior Art

Optical discs are one of various storage media used nowadays. Data can be recorded on the optical disc according to pits in the optical disc tracks. An optical disc drive utilizes a servo control system to focus a laser light outputted from a laser diode on a correct position of the track and then reads the data according to a reflection light of the laser light.

An optical sensor on a pick-up head (PUH) of the optical disc drive detects the reflected light to generate signals A, B, C, D. After generating the tracking error signal TE according to the signals A, B, C, and D, the servo control system determines whether the focus point of the laser light diverges from the track of the optical disc according to changes in the tracking error signal TE.

Since the prior art apparatus determines the phase difference between the signal A+C and the signal B+D according to the pulse width while the tracking error signal TE is being generated, when high accuracy is required for the tracking error signal TE, a high sampling rate is accordingly necessary for converting the analog signal into the digital signal, and the back end circuits must operate in a higher clock rate.

SUMMARY OF THE INVENTION

One objective of the claimed invention is therefore to provide an apparatus and related method for solving the abovementioned problems.

One objective of the claimed invention is to provide an apparatus and related method for generating a tracking error signal.

An embodiment of the present invention discloses an apparatus for generating a tracking error signal, the apparatus comprising: an optical sense module for generating a first analog signal and a second analog signal according to a reflection light reflected from a laser emitted to an optical disc; an ADC module coupled to the optical sense module for converting the first and second analog signals into a first and a second digital signals respectively; a delay module coupled to the ADC module for delaying the first and second digital signals to generate a first and a second delay signals respectively; and a signal generation module coupled to the ADC module and the delay module for generating the tracking error signal according to the first and second digital signals and the first and second delay signals.

Another embodiment of the present invention further discloses a method for generating a tracking error signal, the method comprising the following steps: generating a first analog signal and a second analog signal according to a reflection light; translating the first and second analog signals into a first and a second digital signals respectively; delaying the first and second digital signals to generate a first and a second delay signals respectively; and generating the tracking error signal according to the first and second digital signals and the first and second delay signals.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a truth table corresponding to the operation of the digital logic module according to an embodiment.

DETAILED DESCRIPTION

Figure 1:
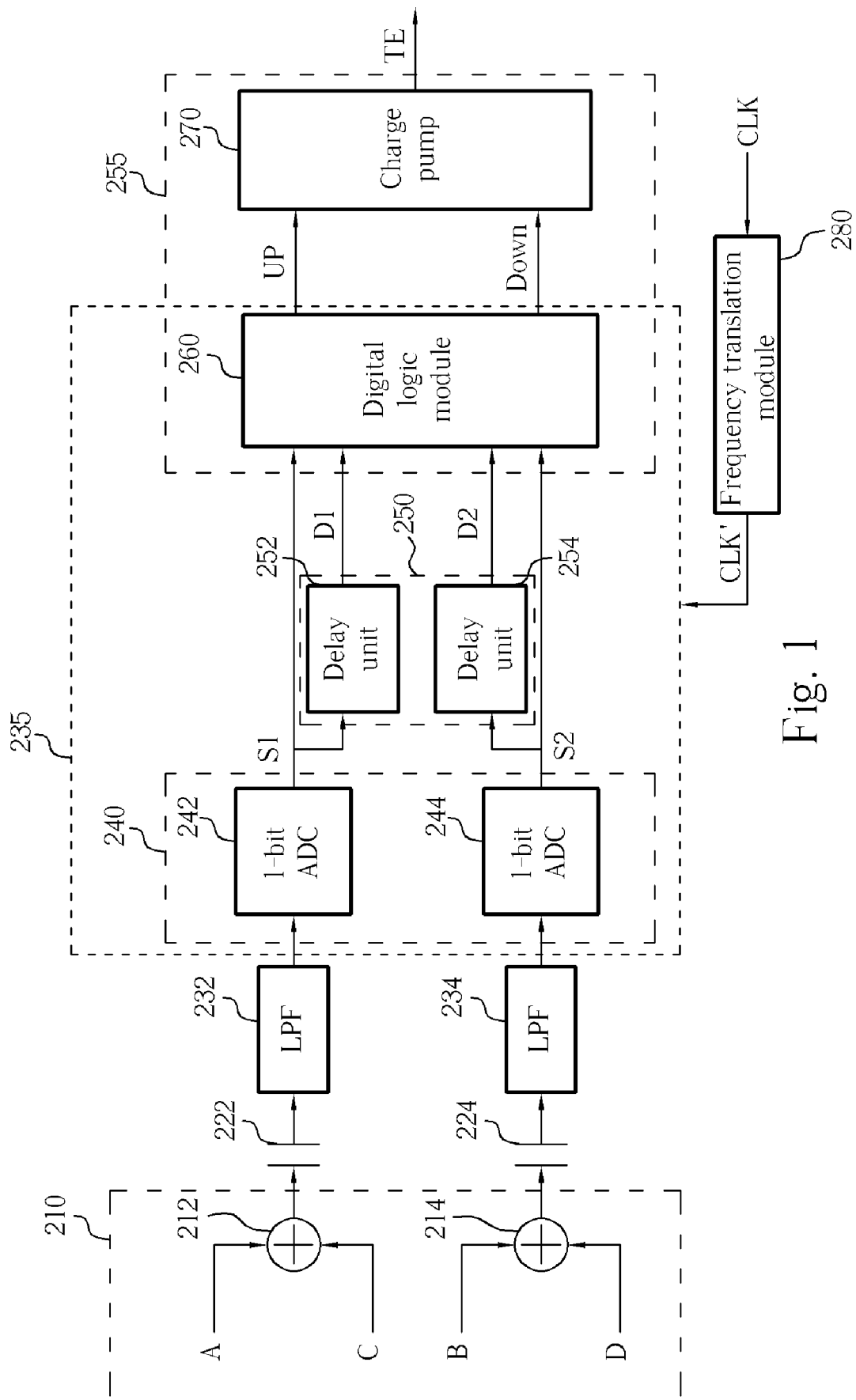
FIG. 1 is an apparatus for generating a tracking error signal in an optical disc drive according to an embodiment of the present invention.

Please refer to FIG. 1. FIG. 1 is an apparatus for generating a tracking error signal TE in an optical disc drive according to an embodiment of the present invention. The optical sense module 210 generates a first analog signal A+C and a second analog signal B+D. The AC coupling capacitors 222 and 224 and low pass filters (LPF) 232 and 234 are utilized to remove a DC component and a noise component of these analog signals A+C and B+D. The 1-bit analog-to-digital converters (ADC) 242 and 244 are utilized to convert the first analog signal A+C and the second analog signal B+D into a first digital signal S1 and a second digital signal S2 according to the sampling rate 1/Ts, which is approximately equal to a channel bit rate 1/T. The signals S1 and S2 are 1-bit digital signals. The delay units 252 and 254 delay the signals S1 and S2 by the time 2Ts to generate a first delay signal D1 and a second delay signal D2 respectively. Please note that the delay time 2Ts serves as an example, and a designer can determine the time delayed by the delay units 252 and 254 according. The signal generation module 255 outputs a tracking error signal according to the signals S1, S2, D1, and D2.

In this embodiment, the signal generation module 255 comprises a digital logic module 260 and a charge pump 270. The digital logic module 260 is utilized to generate a first control signal UP and a second control signal DOWN according to the signals S1, S2, D1, and D2. The charge pump 270 raises a potential of the tracking error signal TE when the signal UP is enabled, and lowers the potential of the tracking error signal TE when the signal DOWN is enabled.

FIG. 2 is a truth table corresponding to the operation of the digital logic module 260 according to an embodiment. In this embodiment, when the value of the signal S1 is different from the values of the signals S2, D1, D2, or when the value of the signal D2 is different from the values of the signal S1, S2, D1, the digital logic module 260 can determine that the phase of the first digital signal S1 precedes the phase of the second digital signal S2. At this moment, the digital logic module 260 enables the UP signal to raise the potential of the tracking error signal through the charge pump 270. Similarly, when the value of the signal S2 is different from the values of the signals S1, D1, D2, or when the value of the signal D1 is different from the values of the signals S1, S2, D2, the digital logic module 260 can determine that the phase of the second digital signal S2 precedes the phase of the first digital signal S1. At this moment, the digital logic module 260 enables the DOWN signal to lower the potential of the tracking error signal through the charge pump 270.

The 1-bit ADC 242 samples by utilizing a sampling frequency 1/Ts, which is approximately equal to the channel bit rate 1/T. If the first analog signal A+C precedes the second analog signal B+D by time Δt, the probability of the signal UP being enabled is proportional to Δt, meaning that the signal UP includes more "1" when Δt is no less than zero and no more than 2Ts. Therefore, the larger the phase difference between the first analog signal A+C and the second analog signal B+D, the larger the level of tracking error signal TE charged from the charge pump 270 controlled by the signal UP is. Similarly, if the first analog signal A+C is behind the second analog signal B+D by time Δt, the probability of the signal DOWN being enabled is proportional to Δt, which means the signal DOWN includes more "1" when Δt is no less than zero and no more than 2Ts. Therefore, the larger the phase difference between the first analog signal A+C and the second analog signal B+D, the larger the level of tracking error signal TE discharged from the charge pump 270 controlled by the signal DOWN is. Obviously, the servo control system knows the phase difference between the first analog signal A+C and the second analog signal B+D by detecting the change in the tracking error signal TE and then controls the PUH properly. The present invention apparatus further includes a frequency translation module 280 for adjusting a frequency of the clock signal synchronized to the real channel by the ratio of N/M (N/M≈1, where N and M are relatively primes) to enable the digital apparatus 235 of the present invention, which includes the ADC module 240, the delay module 250, and the digital logic module 260, to operate in frequency 1/Ts. Furthermore, the apparatus of this embodiment utilizes an oscillation component to generate the clock signal CLK' whose frequency is equal to 1/Ts. In an embodiment, the frequency translation module 280 also includes a phase locked loop (PLL) circuit.

Figure 3:
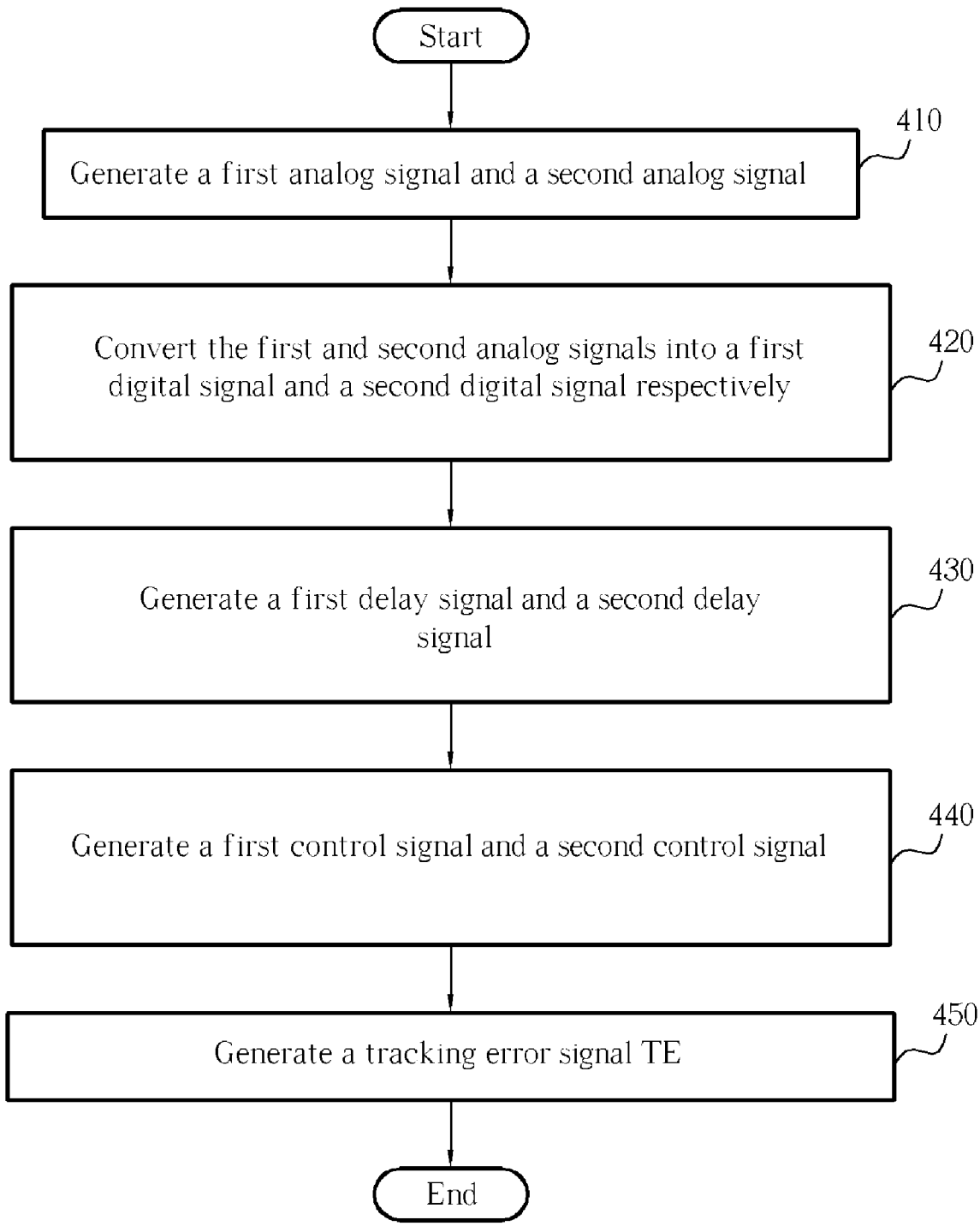
FIG. 3 is a flowchart describing a general method according to an embodiment of the present invention.

FIG. 3 is a flowchart describing a general method according to an embodiment of the present invention. The steps are detailed as follows.

Step 410: Generate a first analog signal A+C and a second analog signal B+D according to a reflection light of a laser emitted to an optical disc.

Step 420: Convert the first and second analog signals into a first digital signal S1 and a second digital signal S2 respectively. In an embodiment, the first and second digital signals S1 and S2 are 1-bit digital signals.

Step 430: Delay the first digital signal S1 to generate a first delay signal D1, and delay the second digital signal S2 to generate a second delay signal D2. Please note that the delay time can be designed.

Step 440: Generate a first control signal UP and a second control signal DOWN according to the first and second digital signals S1 and S2 and the first and second delay signals D1 and D2. For example, the truth table of FIG. 2 is an example of the relations between the first and second digital signals S1 and S2, the first and second delay signals D1 and D2, and the first control signal UP and the second control signal DOWN.

Step 450: Generate a tracking error signal TE according to the first control signal UP and the second control signal DOWN. In an embodiment, the level of the tracking error signal TE can be raised when the first signal UP is enabled, and be lowered when the second signal DOWN is enabled.

Although the signal A+C is the first analog signal and the signal B+D is the second analog signal in the above embodiment, the signals A and B can also be the first and second analog signals respectively, or the signals C and D can also be the first and second analog signals respectively. The present invention enables easy design of the digital circuits and results in a higher operation frequency and a wider phase detection range (~±2T).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for generating a tracking error signal, the apparatus comprising:
    an optical sense module for generating a first analog signal and a second analog signal according to the signal reflected from an optical disc;
    an ADC (Analog-to-Digital Converter) module coupled to the optical sense module for translating the first and second analog signals into a first and a second digital signals respectively;
    a delay module coupled to the ADC module for delaying the first and second digital signals to generate a first and a second delay signals respectively; and
    a signal generation module coupled to the ADC module and the delay module for generating the tracking error signal according to the first and second digital signals and the first and second delay signals, the signal generation module comprising:
        a digital logic module for generating a first control signal and a second control signal according to the first and second digital signals and the first and second delay signals;
    wherein the digital logic module generates the tracking error signal according to the first and the second control signals, and the digital logic module enables the first or the second control signal when a value of one of the first and second digital signals and the first and second delay signals is different from values of the others of the first and second digital signals and the first and second delay signals.

2. The apparatus of claim 1, wherein the signal generation module further comprises:
    a charge pump coupled to the digital logic module for generating the tracking error signal according to the first and second control signals.

3. The apparatus of claim 2, wherein the charge pump raises a level of the tracking error signal when the first control signal is enabled, and lowers the level of the tracking error signal when the second control signal is enabled.

4. The apparatus of claim 1, wherein the digital logic module enables the first control signal when a value of the first digital signal is different from values of the first and second delay signals and the second digital signal.

5. The apparatus of claim 1, wherein the digital logic module enables the second control signal when a value of the second digital signal is different from values of the first and second delay signals and the first digital signal.

6. The apparatus of claim 1, wherein the digital logic module enables the second control signal when a value of the first delay signal is different from values of the first and second digital signals and the second delay signal.

7. The apparatus of claim 1, wherein the digital logic module enables the first control signal when a value of the second delay signal is different from values of the first and second digital signals and the first delay signal.

8. The apparatus of claim 1, wherein the ADC module is a 1-bit ADC module.

9. The apparatus of claim 1, wherein the delay module delays the first and second digital signals two times of the sampling period of the ADC module to generate the first and second delay signals respectively.

10. The apparatus of claim 1 further comprising:

a frequency translation module for outputting a reference clock to the ADC module, the delay module and the signal generation module.

11. The apparatus of claim 10, wherein the frequency translation module is a PLL (Phase Locked Loop) circuit.

12. A method for generating a tracking error signal, the method comprising the following steps:

generating a first analog signal and a second analog signal according to the signals reflected from an optical disk;

translating the first and second analog signals into a first and a second digital signals respectively;

delaying the first and second digital signals to generate a first and a second delay signals respectively;

generating a first and a second control signals according to the first and second digital signals and the first and second delay signals; and generating the tracking error signal according to the first and second control signals;

wherein the first or the second control signal is enabled when a value of one of the first and second digital signals and the first and second delay signals is different from values of the others of the first and second digital signals and the first and second delay signals.

13. The method of claim 12, wherein the first control signal is enabled when a value of the first digital signal is different from values of the first and second delay signals and the second digital signal.

14. The method of claim 12, wherein the second control signal is enabled when a value of the second digital signal is different from values of the first and second delay signals and the first digital signal.

15. The method of claim 12, wherein the second control signal is enabled when a value of the first delay signal is different from values of the first and second digital signals and the second delay signal.

16. The method of claim 12, wherein the first control signal is enabled when a value of the second delay signal is different from values of the first and second digital signals and the first delay signal.

17. The method of claim 12, wherein a level of the tracking error signal is raised when the first control signal is enabled, and the level of the tracking error signal is lowered when the second control signal is enabled.

18. The method of claim 12, wherein the first and second digital signals are 1-bit digital signals.

19. The method of claim 12, wherein the first and second analog signals are converted into the first and second digital signals in a sampling period of Ts, and the first and second digital signals are delayed 2Ts to generate the first and second delay signals respectively.

* * * * *